United States Patent [19]

McClelland

[11] 4,137,377

[45] Jan. 30, 1979

[54] MAINTENANCE-FREE LEAD-ACID CELL

[75] Inventor: Donald H. McClelland, Littleton, Colo.

[73] Assignee: The Gates Rubber Company, Denver, Colo.

[21] Appl. No.: 843,470

[22] Filed: Oct. 19, 1977

[51] Int. Cl.² .............................................. H01M 2/14
[52] U.S. Cl. ................................................... 429/145
[58] Field of Search ......................................... 429/145

[56] References Cited

U.S. PATENT DOCUMENTS

| 2,117,371 | 5/1938 | Slayter ................................. | 429/145 |
| 3,014,085 | 12/1961 | Bachman ............................. | 429/145 |
| 3,753,784 | 8/1973 | Eisenacher .......................... | 429/145 |

FOREIGN PATENT DOCUMENTS 39-288  0000  Japan.

Primary Examiner—Donald L. Walton
Attorney, Agent, or Firm—Curtis H. Castelman, Jr.; Raymond Fink; H. W. Oberg, Jr.

[57] ABSTRACT

A rechargeable maintenance-free normally sealed lead-acid cell is disclosed having a multilayered electrolyte-retaining separator composed of outer highly porous and compressible microdiameter glass fibrous layers, which contact the positive and negative plates, and a sandwiched substantially dimensionally stable microporous layer having, compared with the glass fibrous layers, a substantially higher resistivity and lesser thickness. The electrolyte is proportioned within the cell and separator so that the bulk of the electrolyte in the cell is contained within the pores of the multilayered separator, and distributed between the layers of the separator in a preferred manner.

2 Claims, 2 Drawing Figures

MAINTENANCE-FREE LEAD-ACID CELL

BACKGROUND OF THE INVENTION

This invention relates to maintenance-free lead-acid cells, and more particularly to a maintenance-free cell with an improved separator and electrolyte distribution within the separator for improved shorting resistance, while accommodating gas transport in a normally sealed configuration.

Separators for maintenance-free cells having multiple layers, including highly retentive ultrafine fiber diameter glass materials, are known, for instance as taught in Eisenacher et al. in U.S. Pat. No. 3,753,784. The use of microporous layers sandwiched between the glass layers for resistance to penetration by metallic growths from the plates is also a known technique.

The subject invention is directed primarily to limited electrolyte maintenance-free cells and a multilayered penetration-resistant separator for use therein, wherein the separator contains the bulk of the electrolyte contained in the cell. The separator has an extremely high electrolyte retentivity and yet is thin with an overall dimension of less than about 1.5 millimeters. Such thin separators made of microfiber diameter glass are extremely non-homogeneous, for instance exhibiting variations from plus or minus ten percent in glass weight per unit area. Because of this extreme thinness in overall separator dimension coupled with the marked variations in structure of the separator layers, relatively high current densities will exist at the plates in the regions of lowest electrical resistance and lowest tortuosity. These regions develop bumps and exhibit shape change eventually leading to short-circuiting as the opposite polarity plates come into mutual contact.

It is a primary object of the subject invention to provide a highly electrolyte retentive thin separator for use in sealed maintenance-free calls, operating with internal gas recombination, by "homogenizing" the electrolytic resistivity and structure of the multi-layered separator, and by providing uniform electrolyte distribution and void volume distribution within the separator layers to enable long cell life in a normally sealed mode.

Additional relevant prior art includes U.S. Pat. No. 3,862,861 to McClelland et al, U.S. Pat. No. 3,900,341 to Shoichiro et al, Canadian Pat. No. 451,391 to Wells, and Japanese Pat. application Nos. SHO 38/1963-39288 and SHO 39/1964-30352.

SUMMARY OF THE INVENTION

In one aspect, the invention pertains to a rechargeable maintenance-free lead-acid cell having a positive plate, a negative plate, an acid electrolyte, and a highly absorbent thin separator disposed between and in contact with the plates, with the electrolyte being substantially completely absorbed in the separator and plates, and wherein the improvement comprises the combination of (a) a porous multilayered electrolyte retaining separator including (1) at least one readily compressible layer of about 75 percent minimum porosity microdiameter glass fibrous material contacting the positive plate, (2) at least one such layer, as defined in "(1)," contacting the negative plate; and (3) a substantially dimensionally stable microporous layer(s) positioned intermediate the layers of glass fibrous material and having, compared with the glass fibrous materials, a substantially higher electrolytic resistivity, and a lesser thickness; and (b) electrolyte of such limited proportion and distribution that the bulk of the electrolyte in the cell is contained within the pores of the multilayered separator.

BRIEF DESCRIPTION OF THE DRAWINGS

The invention will be described in part by reference to the accompanying drawings, in which like numerals designate like parts, and in which.

PREFERRED EMBODIMENTS OF THE INVENTION

Figure 1:
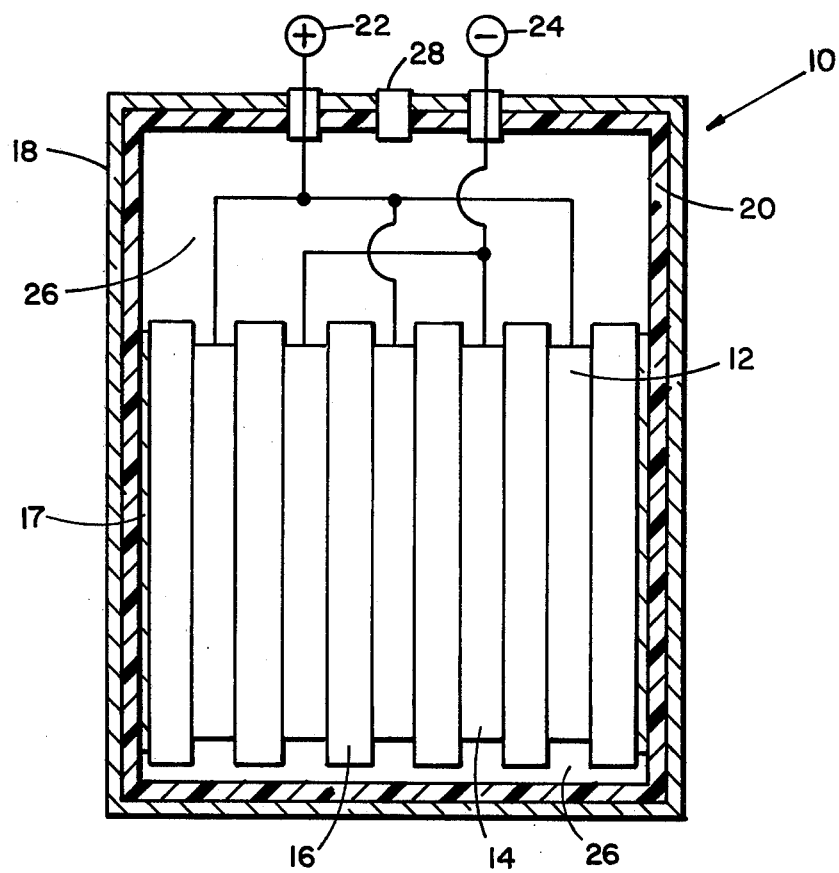
FIG. 1 is an elevational cross sectional, schematic view of the maintenance-free cell of the subject invention, showing the cell pack elements enlarged for ease of illustration.
Figure 2:
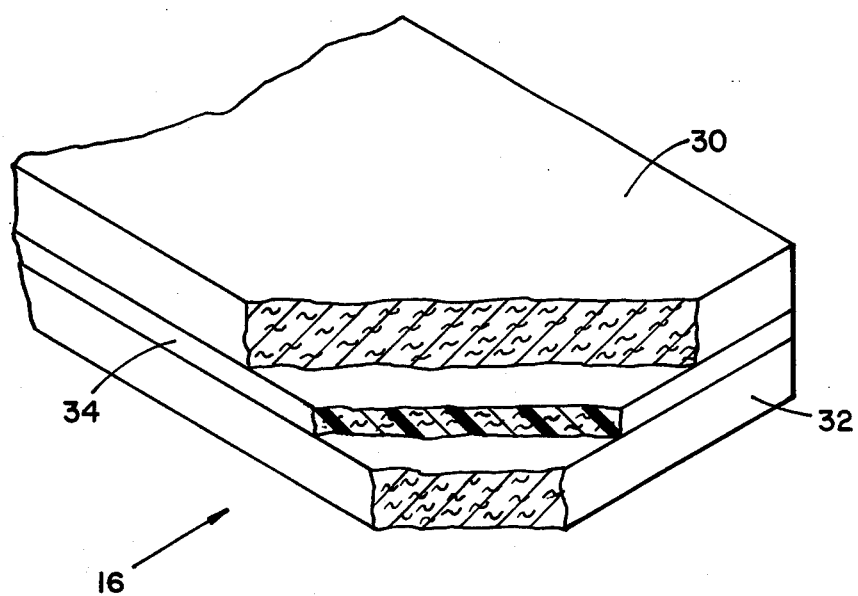
FIG. 2 is a perspective, partial cutaway view of a multilayered separator employed in the cell of FIG. 1.

Referring first to FIG. 1, there is shown generally at 10 a maintenance-free lead cell having a series of parallel stacked positive plates 12, negative plates 14, and interleaved separators 16, and optional outer spacers 17, the cell pack of plates and separators existing under firm mutual stacking pressure. Although shown in vertical parallel stacked relation, the cell pack may be formed into any desired configuration or orientation, such as spirally wound into a jelly-roll configuration or horizontally stacked as in a button cell.

The cell pack elements are confined within preferably a normally sealed container which may be formed of an insulating material, or alternatively in the preferred form composed of an outer metallic container 18 lined with an insulting enclosure 20 e.g., of plastic. The plates of common polarity are connected together as shown, and the positive 22 and negative 24 output terminals are connected to the appropriate terminal straps through electrolyte-tight passageways in the container wall, in known manner. It is preferred that the cell is equipped with a resealable safety valve shown schematically at 28, for release of excessive gas pressure whether abnormally generated or if developed during the normal operation and overcharging of the cell. It is preferred that the safety valve is normally closed and is set to vent only under an abnormal occurrence at an elevated superatmospheric pressure, e.g., above about 25 psig.

The electrode plates, which form no specific part of the invention, may be the conventional lead grid substrate laden with electrochemically active positive and negative lead pastes, e.g., principally lead dioxide for the positive, and lead in the negative, upon formation. High purity lead grids of high hydrogen overvoltage are preferred where sealed operation is sought.

In accordance with the invention, separator 16 is formed of a multilayered member which is designed to retain the bulk of the electrolyte employed in the cell. The porous multilayered electrolyte retaining separator 16 includes at least one readily compressible layer 30 of microdiameter glass fibrous material adapted to contact the positive plate, and a similar type layer 32 adapted to contact the negative plate. Multiple adjoining layers may be used. The layers must be sufficiently compressible to intimately conform to the surface of the adjoining plates. It is critical that the glass fibers comprising layers 30 and 32 be of microdiameter, preferably having an average diameter of less than about 3 microns, more preferably an average diameter of less than about 0.9 microns, and most preferably having an average diameter of less than about 0.65 microns. The porosity of these glass layers will normally be at least about 75 percent, and more preferably in the range from about 82 to about 95 percent. Materials of this type have an extremely high affinity for sulfuric acid electrolyte by virtue of the natural high heat of wetting of acid on the glass material, coupled with the extremely high surface area, e.g., from about 2 to about 8 and more preferably from about 3 to about 6 square meters per gram of silica, resulting from the ultrafine fiber diameter of the glass.

It is preferred that the uncompressed thickness of the glass layer(s), e.g., layer 30, be from about 0.25 to about 1 and more preferably from about 0.25 to about 0.6 mm. Upon compression, the thickness may be reduced to no less than about 70 percent of the original thickness, generally in the range from about 85 to about 95 percent of the original thickness.

Sandwiched between the microdiameter glass fibrous layers 30 and 32, is microporous layer 34. The pore size of this layer may average preferably from aout 0.1 to about 0.9 microns, and preferably the average pore size is substantially less than the corresponding average pore size in layers 30 and 32. In this manner, the microporous layer, when wetted with electrolyte, has a substantially higher electrolytic resistivity than its adjoining glass fibrous layers, thereby acting as an effective attenuator of plate derived metallic growths. This is the case even though the average thickness of layer 34 is substantially less than that of the adjoining fibrous layers, and preferably ranges from about 0.1 to about 0.5 and more preferably from about 0.1 to about 0.25 mm. Preferably the resistivity of the microporous layer (per equivalent volume) is from about 1.5 to about 5 and more preferably from about 2 to about 4 times the resistivity of the glass layer.

The microporous layer also is substantially dimensionally stable serving as a puncture resistant, thin physical barrier to metallic growths. Such layer has little or no compressibility, as contrasted with the outer glass layers. In this manner the composite separator will readily conform to the surface of the adjoining plates, and yet the microporous layer maintains its dimension and porperties intact.

Examples of suitable materials for layer 34 include microporous polyvinylchloride, polyolefins, phenolics, acrylonitriles, and polyesters. The microporous layer may be fiber-based, or may consist of a matrix with interconnecting pores formed after expelling a dispersed solvent by heat or other means.

A specific microporous material which may be used is taught in U.S. Pat. No. 3,900,341. According to that patent, the microporous sheet is prepared by depositing a uniform solution having as its main component synthetic resin, a solvent dissolving this synthetic resin, and a non-solvent not dissolving it on a base such as a porous body, and drying it. It may be made, for example, by depositing a solution prepared by dissolving seven parts of a heat-proof polyvinylchloride resin in 63 parts of tetrahydrofuran and adding 30 parts of ethyl alcohol to this solution on a base of a polyester non-woven fabric, or acrylonitrile base, of a thickness of about 0.08 mm. or a polypropylene non-woven fabric of a thickness of about 0.15 mm. and drying it. The resulting separator may have a thickness in the range of 0.1 to about 0.2 mm.

Multiple layers of the microporous material, either adjacent or not, may be used although a single layer preferably no greater than about 75 percent of the thickness of the thinnest of layer 30 or 32 is usually adequate.

In combination with the multilayered separator disclosed above, the invention is directed to a rather critical electrolyte distribution within the cell. The acid electrolyte is substantially completely absorbed in the separator and plates, there being normally no free electrolyte within the voided volume 26 in the cell, with the bulk of the electrolyte being contained within the pores of the multilayered separator.

It is also preferred that the electrolyte be of such limited proportion that the multilayered separator have a significant void volume therein, i.e., it is not completely saturated with electrolyte as in most prior art lead-acid separators. In this manner, gas transport directly between the plates for internal consumption or recombination of generated gases at significant ranges of overcharge is enhanced.

Since in the maintenance-free cell of this invention the bulk of the electrolyte of the cell is held within the separator phase, it is important that the previously mentioned electrolyte-free void volume be a relatively small proportion of the pore volume of the separator to permit simultaneously a relatively large volume of electrolyte to be contained within the separator. The void volume levels, on the other hand, are sufficient to enable the required gas transport.

The life of the cell is enhanced by the shorting attenuation offered by the microporous layer, particularly by its ability to "homogenize", i.e., reduce the variations of, the overall resistance and structure of the multilayered separator even through the glass layers varying widely in density, and thickness.

It will be understood that the invention is capable of a variety of modifications and variations which will be made apparent to those skilled in the art by a reading of this specification and which are to be included within the spirit and scope of the invention as determined by the claims appended hereto.

What is claimed is:

1. In a rechargeable maintenance-free lead-acid cell having a positive plate, a negative plate, an acid electrolyte, and a porous multilayered highly absorbent thin separator disposed between and in contact with the plates, with the electrolyte being substantially completely absorbed in the separator and plates, the combination of:

said porous multilayered electrolyte retaining separator including (1) at least one compressible layer of about 82–95 percent porosity microdiameter glass fibrous material compressed to intimately conform to the positive plate, and exhibiting glass weight variations from plus or minus 10 percent per unit area of the layer, and being compressed in the range from about 70 to about 95 percent of its uncompressed thickness, and having an average fiber diameter of less than about 0.65 microns with a surface area of from about 2 to about 8 square meters per gram of silica of the glass, (2) at least one such layer, as defined in "(1)", compressed to intimately conform to the negative plate, and (3) a substantially dimensionally stable microporous layer(s) positioned intermediate the layers of glass fibrous material and having, compared with the glass fibrous materials, a lesser thickness, and a resistivity from about 1.5 to about 5 times the resistivity of the glass; and said electrolyte being of such limited proportion and distribution that the bulk of the electrolyte in the cell is contained within the pores of the multilayered separator yet the multilayered separator has a substantial electrolyte-free void volume therein.

2. The cell of claim 1 wherein the microporous material has a pore size from about 0.1 to about 0.9 microns.

* * * * *